Jan. 10, 1961   R. BINDER   2,967,597
SMOOTHLY OPERATING CENTRIFUGAL CLUTCH
Filed July 8, 1957
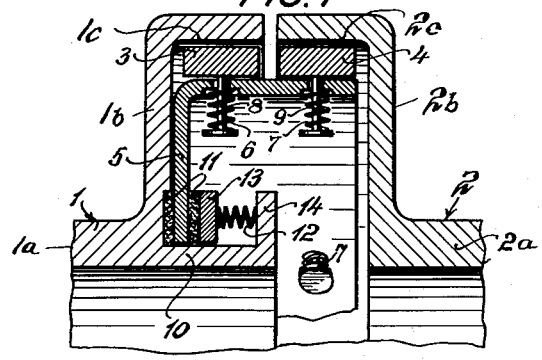
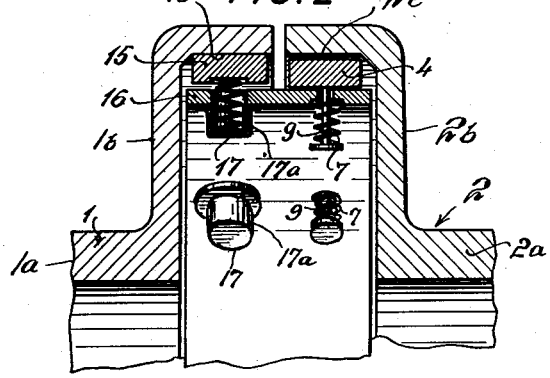
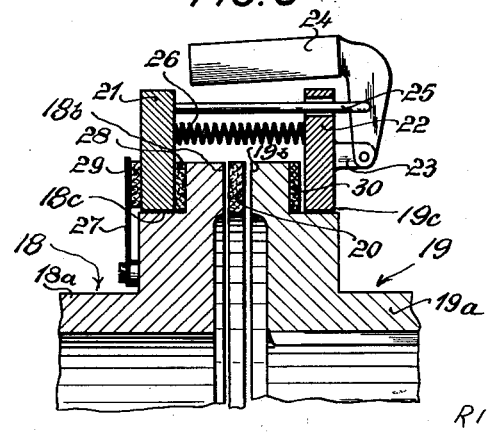
INVENTOR:
RICHARD BINDER
BY
Richardson, David and Nordon
ATTORNEYS.

United States Patent Office 2,967,597
Patented Jan. 10, 1961

2,967,597

SMOOTHLY OPERATING CENTRIFUGAL CLUTCH

Richard Binder, Schweinfurt (Main), Germany, assignor to Fichtel & Sachs A.G., Schweinfurt (Main), Germany, a corporation of Germany Filed July 8, 1957, Ser. No. 670,502

Claims priority, application Germany July 7, 1956

7 Claims. (Cl. 192—105)

The present invention relates to speed-responsive clutches which are selectively engaged and disengaged in accordance with the rotational speed of the driving member of the clutch and more particularly to improved clutches of this character wherein response of the driven member to rapid accelerations of the driving member is delayed for preventing undesirable torque shocks which would otherwise accompany sudden accelerations of the driving member.

Briefly, a clutch in accordance with the invention comprises a driving member adapted to be connected to a prime mover such as an internal combustion engine, a driven member which is to be coupled to the driving member whenever the rotational speed of the driving member exceeds a predetermined minimum value, a freely revolubly intermediate member which carries centrifugal weights, coupling means carried by intermediate member and actuated by the weights for connecting the driving and driven members together, and frictional slip-type coupling means connecting the driving member to the intermediate member for bringing the weights up to speed but with a maximum acceleration which is liimted by the slip-type coupling means.

Various objects, features and advantages of the invention will become apparent upon reading the following specification together with the accompanying drawing forming a part hereof.

Referring to the drawing:

Figure 1 is a fragmentary view in axial section showing an embodiment of the invention wherein separate slip-type coupling means connect the driving member to the weight carrying intermediate member.

Figure 2 is a view similar to Fig. 1 showing a modified form of the invention wherein the weight carrying intermediate member is connected to the driving member by friction arising from spring pressure applied to one of the weight-actuated coupling members so that there is a predetermined minimum amount of coupling between the driving member and the intermediate member in such manner that certain of the weight-actuated coupling members serve simultaneously both as coupling members for torque transmission and also as the slip-type coupling means for limiting the maximum acceleration of the intermediate member.

Figure 3 is similar to Figs. 1 and 2 and shows a further modified form of the invention as applied to a clutch of the plate type.

Referring to Fig. 1, there is a driving member designated generally as 1 which comprises a cylindrical sleeve portion 1a adapted to be connected to the shaft of a prime mover such as the engine of an automotive vehicle (not shown). The driving member 1 also comprises a drum-shaped portion 1b the internal cylindrical surface 1c of which serves as a torque-transmitting friction surface. There is a driven member designated generally as 2 which is provided with a cylindrical sleeve portion 2a coaxial with the sleeve portion 1a of the driving member 1. The driven member 2 similarly comprises an integrally formed drum-shaped portion 2b the internal cylindrical surface 2c of which acts as a torque transmitting friction surface. The drum shaped portions 1b and 2b, respectively, of the driving member 1 and driven member 2 are coaxial and in the drawing, the cylindrical friction surfaces are illustratively shown as having equal diameters. The drum-shaped portions 1b and 2b of the driving member 1 and the driven member 2 confront each other.

Two axially spaced concentric circular series of weights designated 3 and 4 are carried by a cup-shaped intermediate member 5. The weights 3 and 4 are mounted on headed pins 6 and 7, respectively, the pins 6 and 7 passing freely slidably through the periphery of the cup-shaped intermediate member 5. Compression springs 8 and 9 surround the inwardly extending portions of the pins 6 and 7 and yieldingly urge the weights 3 and 4, respectively, radially inwardly against the cylindrical peripheral portion of the intermediate member 5. The central portion of the intermediate member 5 is freely rotatably mounted and is axially displaceable on an axial extension 10 integrally formed with the sleeve portion 1a of the driving member 1. The central portion of the intermediate member 5 is sandwiched between two friction rings 11. A series of compression springs 12 acting on a pressure ring 13 force the friction rings 11 and the central portion of the intermediate member 5 together. The pressure ring 13 is axially movably mounted on the extension 10 but is splined, keyed or otherwise locked to extension 10 for rotation with the driving member 1. One end of each spring 12 bears against the pressure ring 13 and the other end presses against a flange 14 integrally formed on the end of the extension 10, the flange 14 being located within the space defined by the confronting drum-shaped portions of the driving and driven members 1 and 2. The friction rings 11 act as a slip clutch for transmitting a limited maximum torque from the driving member 1 to the intermediate member 5.

In operation, at low speeds the springs 8 and 9 hold the weights 3 and 4 retracted so that they do not engage the cylindrical friction surfaces 1c and 2c of the driving and driven members 1 and 2. As the rotational speed of the driving member 1 is slowly increased, the torque transmitted to the intermediate member 5 through the slip-type coupling formed by the friction rings 11 and pressure ring 13 is sufficient to cause the intermediate member 5 and the weights 3 and 4 to accelerate along with the driving member 1. As the rotational speed of the driving member 1 increases, the centrifugal forces acting on the weights 3 and 4 are correspondingly increased and they gradually overcome the yielding retractile forces of the springs 8 and 9 and move outwardly to press against the cylindrical friction surfaces 1c and 2c of the drum-shaped portions 1b and 2b of the driving and driven members 1 and 2. The driving and driven members 1 and 2 are then gradually coupled together with increasing torque-transmitting capacity as the speed of the driving member 1 increases.

In a motor vehicle, with ordinary engine speeds, the coupling effect is sufficient for transmission of the full engine torque from the driving member 1 to the driven member 2 through the intermediate member 5 by the frictional engagement of the outer faces of the weights 3 and 4 with the inner cylindrical friction surfaces 1c and 2c of the cup-shaped portions 1b and 2b of the driving and driven members 1 and 2.

If the engine is suddenly accelerated to full speed, except for the slip-type coupling 11—13 to the intermediate member 5, the weights 3 and 4 would be suddenly flung out against the cylindrical friction surfaces, 1c and 2c of the driving and driven members 1 and 2. As a result, instead of the desired smooth and gradual engagement of the clutch, there would be an abrupt engagement with an accompanying jolt or shock applied to the driven load. The slip-type coupling limits the maximum torque which can be transmitted to the intermediate member 5 and hence limits its maximum acceleration. This maximum acceleration, in turn, limits the maximum rate at which centrifugal force acting on the weights 3 and 4 can be increased and therefore the rate at which pressure exerted by the weights 3 and 4 against their cooperating friction surfaces 1c and 2c is correspondingly limited. As a result, no matter how rapidly the rotational speed of the driving member 1 is accelerated, the inertia of the weights 3 and 4 and the slip-type coupling comprising the friction rings 11 will always prevent the maximum rate of increase in the frictional coupling between the driving and driven members 1 and 2 from increasing at a rate exceeding the rate which is obtainable with the maximum acceleration of the intermediate member 5, the maximum acceleration of the intermediate member 5, in turn, being limited by the maximum torque transmissible through the friction rings 11. There is no limit, however, on the maximum rotational speed of the intermediate member 5 and hence no limit on the torque transmitting capability of the clutch at higher speeds. Only the acceleration of the intermediate member and the corresponding rate of increase in frictional engagement is limited, whereby torque shocks are effectively eliminated without otherwise interfering with the normal operation of the clutch.

Figure 2 shows a modified embodiment of the invention in which there is no separate slip-type coupling between the driving member and the intermediate member. The general arrangement of the driving and driven members 1 and 2 is the same as described above in connection with Fig. 1. Instead of the cup-shaped intermediate member 5 and the inwardly spring-biased weights 3 of Fig. 1, there is a series of outwardly spring-biased weights 15 carried by an annular intermediate member 16. Each weight 15 is pressed outwardly by a compression spring 17 seated in a cylindrical cup 17a secured to the inner side of the annular intermediate member 16. Suitable supporting means are provided for the intermediate member 16 so that it is maintained freely revolubly mounted with respect to the driving and driven members 1 and 2. The intermediate member 16 is mounted coaxially with respect to the driving and driven members 1 and 2 but is held against axial displacement by the conventional supporting means which have been omitted from the drawing for simplicity of illustration.

In operation, the compression spring 17 presses each weight 15 against the inner cylindrical friction surface 1c of the driving member 1 with a certain predetermined minimum force. This, in turn, provides a certain minimum frictional coupling between the intermediate member 16 and the driving member 1, even when the driving member 1 is completely stopped. If the driving member 1 increases its speed gradually, the intermediate member 16 will also increase its speed at the same rate. The pressure of each weight 15 will increase correspondingly and as the speed increases still further, each weight 4 will overcome the force of its associated spring 9 and will press outwardly into frictional driving engagement with the cylindrical friction surface 2c of the driven member 2. Accompanying any sudden or abrupt acceleration of the driving member 1, and particularly when the driven member 2 is disengaged as at low speeds of the driving member, there will first be a slipping of the weights 15 with respect to the driving member 1 before the intermediate member 16 can be brought up to speed where full torque transmission through the clutch takes place.

Under no-load conditions of the prime mover which is connected to the driving member 1, a rapid and abrupt acceleration of the driving member 1 is a commonplace occurrence. Thus, except for the slip-type coupling between the driving member 1 and the centrifugal weight carrying intermediate member 5 of Fig. 1 or 16 of Fig. 2, there would be a rapid acceleration of the centrifugal coupling weights and the clutch would be slammed abruptly into engagement. As noted above, however, the slip-type coupling avoids such objectionable operation and provides for a smooth engagement of the clutch no matter how abruptly the driving member 1 may be accelerated.

Figure 3 shows the invention as applied to a disc type clutch. The driving member 18 is provided with a sleeve portion 18a which is adapted to be fixedly connected to the drive shaft of a prime mover (not shown). The driven member 19 is similarly provided with a sleeve portion 19a which is adapted to be splined, keyed or otherwise axially slidably connected to the driven shaft (not shown) of the load.

The driving and driven members 18 and 19 are provided with confronting flat annular friction surfaces 18b and 19b between which a flat annular friction member 20 is sandwiched. In practice, it is important only that the friction ring 20 shall be interposed between the driving and driven friction surfaces 18b and 19b for torque transmission between the driving and driven members 18 and 19, respectively. Accordingly, the ring 20 may be secured, either to the surface 18b or to the surface 19b, or it may be suitably centered by any desired conventional means (not shown). When the driven member 19 is displaced toward the left in Fig. 3, the friction ring 20 is squeezed between the friction surfaces 18b and 19b of the driving member 18 and the driven member 19 so that the driving and driven members are coupled together for torque transmission through the clutch. The driving member 18 is annularly shouldered as indicated at 18c and a pressure ring 21 is freely revolubly carried on the shouldered portion. The driven member 19 is similarly shouldered at 19c and another pressure ring 22 is freely revolubly mounted on the shouldered portion of the driven member. The pressure rings 21 and 22 are connected together for rotation as a unit and each pressure ring is freely axially displaceable on its respective shouldered portion.

A series of projecting lugs 23 is fixed to the pressure ring 22. Each lug 23 has a centrifugal weight 24 pivotally connected thereto as shown. When the weights 25 are acted upon by centrifugal force, each weight tends to turn clockwise when positioned at the top of the clutch as viewed in Fig. 3. Each weight 24 is connected to the pressure ring 21 by a tie rod 25; each tie rod 25 passing freely through an aperture formed in the pressure ring 22. The pressure rings 21 and 22 are continuously yieldingly urged apart by helical compression springs 26.

Mounted on the driving member 18, there is a series of flat leaf springs 27. There are flat annular friction members 28 and 29 which are disposed on opposite sides of the pressure ring 21, the friction ring 29 being engaged directly by the leaf springs 27. There is also a flat annular friction member 30 disposed in the shouldered portion 19c of the driven member 19 for engagement by the pressure ring 22. The leaf springs 27 acting on the friction rings 28 and 29, between which the pressure ring 21 is sandwiched, provide a slip-type coupling between the driving member 18 and the intermediate member comprising the interconnected pressure rings 21 and 22 together with the centrifugal weights 24.

In operation, starting with the driving and driven member uncoupled from each other as shown, if the driving member 18 were suddenly to be accelerated to full rotational driving velocity, the centrifugal clutch control weights 24 would not attain this full velocity immediately as in other forms of clutches where the centrifugal weights are carried by or connected directly to the driving member. Instead, the slip-type coupling provided by the friction rings 28 and 29 with respect to the pressure ring 21 limits the maximum acceleration of the intermediate member 21—22. As a result, the acceleration of the intermediate member 21—22 is not as great as that of the driving member 18. Accordingly, the weights 24, instead of being brought abruptly up to speed and slamming the clutch into its engaged condition, are accelerated gradually at the maximum rate provided by the torque-limiting slip-type coupling 27—28—29. As the speed increases, the weights 24 fly outwardly, tension is exerted on the tie rods 25, the pressure rings 21 and 22 are drawn together, the driven member 19 is forced toward the driving member 18 and the driving and driven members become gradually and firmly coupled together for torque transmission through the annular friction member 20 which is sandwiched between the friction faces 19b and 20b of the driving and driven members. When the speed of the driving member 18 is reduced, the compression springs 26 urge the pressure rings 21 and 22 apart and the clutch becomes disengaged as shown in Fig. 3.

While I have shown what I believe to be the best embodiments of my invention, it will be apparent to those skilled in the art that various changes and modifications may be made without departing from the spirit and scope of the invention as defined in the appended claims.

What is claimed is:

1. A speed-responsive clutch comprising a revoluble driving member adapted to be driven by power operated means, a revoluble driven member in axial alignment with said driving member, an intermediate member in axial alignment with said driving and driven members, said intermediate member being freely revoluble independently of either of said driving or driven members, coupling means carried by said intermediate member and simultaneously engageable with both of said driving and driven members for coupling said driving and driven members together for torque transmission through said intermediate member, centrifugal weight means carried by said intermediate member and acting on said coupling means, said centrifugal weight means causing said coupling means to couple said driving member to said driven member through said intermediate member, resilient means acting on said centrifugal weight means and yieldingly preventing said centrifugal weight means form causing said coupling means to couple said driving and driven members together through said intermediate member until said intermediate member has been accelerated to a predetermined minimum coupling speed, and spring-pressed slip-type friction means carried by said driving member and continuously engaging said intermediate member for limited torque transmission from said driving member to said intermediate member at all speeds, said intermediate member being freely revoluble with respect to said driven member at speeds below said coupling speed, said slip-type friction means limiting the maximum rate of acceleration of said intermediate member to said coupling speed.

2. A speed responsive clutch comprising in combination: a driving member, a driven member, freely revoluble coupling means for selectively connecting said driving and driven members together, centrifugal weight actuated means connected for rotation with said coupling means and acting on said coupling means for selectively causing said coupling means to connect said driving and driven members together, resilient means yieldingly preventing said coupling means from connecting said driving and driven members together until said centrifugal weight actuated means has been accelerated to a predetermined minimum coupling speed, and spring-pressed slip-type friction means continuously connecting said coupling means and said centrifugal weight actuated means for rotation with said driving member at all speeds, the maximum torque transmissible from said driving member to said weight actuated means being limited by said friction means at speeds below said coupling speed, said friction means thereby limiting the maximum rate of acceleration of said weight actuated means to said coupling speed, said driven member being freely revoluble with respect to said coupling means at all speeds below said coupling speed.

3. A speed responsive clutch comprising two revoluble confronting cup-shaped members in axial alignment with each other, one of said members being a driving member and the other a driven member, an intermediate member freely revolubly disposed between said driving and driven members in axial alignment therewith, weights carried by said intermediate member, said weights being movable to engage said cup-shaped members and connect them together through said intermediate member, spring-pressed slip-type friction means continuously connecting said intermediate member to said driving member exclusively of said driven member, resilient means acting on said weights and yieldingly urging them out of engagement with said driving and driven members until said intermediate member has attained a predetermined minimum coupling speed, said friction means limiting the maximum rate of acceleration of said intermediate member to said coupling speed by said driving member.

4. A clutch according to claim 3, in which said slip-type friction means is separate from said weights.

5. A clutch according to claim 3, in which said slip-type friction means comprises spring means urging certain of said weights into frictional engagement with said driving member, and said resilient means being further spring means yieldingly urging the weights which are engageable with said driven member out of engagement therewith.

6. A speed responsive clutch of the class described, comprising aligned revoluble driving and driven members, frictional coupling means for connecting said driving and driven members together, centrifugal weight actuated means acting on said frictional coupling means for selectively causing said driving and driven members to be connected together whenever the speed of said driving member exceeds a predetermined minimum speed, and slip-type connecting means of limited torque transmitting capacity continuously connecting said centrifugal weight actuated means to said driving member exclusively of said driven member.

7. A speed responsive clutch comprising axially aligned revoluble driving and driven members, one of said members being axially displaceable with respect to the other member, friction means interposed between said two members for connecting them together, a set of pressure rings freely revolubly mounted on said members, said pressure rings being displaceable toward each other for drawing said members into engagement with said friction means, spring means urging said pressure rings apart, centrifugal weight means carried by at least one of said rings, said weight means drawing said pressure rings progressively toward each other as the rotational speed of said weights is increased, and slip-type frictional coupling means continuously connecting said pressure rings and said weights to said driving member exclusively of said driven member to be driven by said driven member with limited maximum acceleration at all speeds of said driving member.

References Cited in the file of this patent

UNITED STATES PATENTS

| 1,683,954 | Carrey | Sept. 11, 1928 |
| 1,981,167 | Frost | Nov. 20, 1934 |
| 2,016,643 | Lowndes | Oct. 8, 1935 |

FOREIGN PATENTS

| 365,068 | France | Sept. 3, 1906 |
| 552,134 | Germany | June 9, 1932 |
| 615,125 | Germany | June 28, 1935 |
| 630,753 | Germany | June 11, 1936 |
| 1,075,696 | France | Apr. 14, 1954 |